United States Patent

[11] 3,592,514

[72] Inventor Edward J. De Hoff
 Dayton, Ohio
[21] Appl. No. 841,001
[22] Filed July 11, 1969
[45] Patented July 13, 1971
[73] Assignee General Motors Corporation
 Detroit, Mich.

[54] PRESSURE MODULATOR
 5 Claims, 1 Drawing Fig.
[52] U.S. Cl. .................................. 303/21 F,
 188/181 A, 251/25, 251/30, 303/6 R
[51] Int. Cl. .................................. B60t 8/02
[50] Field of Search............................ 303/21,
 61—63, 68—69, 6; 188/181; 251/25, 30

[56] References Cited
UNITED STATES PATENTS

| | | | |
|---|---|---|---|
| 3,433,535 | 3/1969 | Horvath | 303/21 |
| 3,441,320 | 4/1969 | Flory | 303/21 |
| 3,467,441 | 9/1969 | Clark et al. | 303/21 |
| 3,486,800 | 12/1969 | Ayers | 303/21 |
| 3,495,882 | 2/1970 | Stelzer | 303/21 |

Primary Examiner—Milton Buchler
Assistant Examiner—John J. McLaughlin
Attorneys—W. E. Finken and D. D. McGraw ABSTRACT: A brake pressure modulator in which the pressure controlling signals are received electrically by a release valve and a hold valve. The hold valve is mounted on the modulator power wall and is normally open to admit vacuum from the modulator vacuum chamber to the modulator variable pressure chamber. The release valve is mounted on the variable pressure chamber housing section and is normally closed. In the normal condition, the modulator provides for a direct connection between the master cylinder of a brake system and the wheel brakes to be controlled by the modulator. In the release stage of operation, the release valve is opened and the hold valve is closed. The modulator power wall moves to disconnect the brake master cylinder and the wheel brakes being controlled, and upon sufficient modulator power wall movement, the pressure is decreased at the wheel brakes by increasing the brake fluid volume. The modulator provides for a hold stage in which both valves are closed, thereby positioning the power wall to maintain a brake pressure at the wheel brakes. The modulator will return to the brake apply stage when the signals to the valves return them to their normal positions. The modulator is used in an antilock brake system.

PATENTED JUL 13 1971
3,592,514
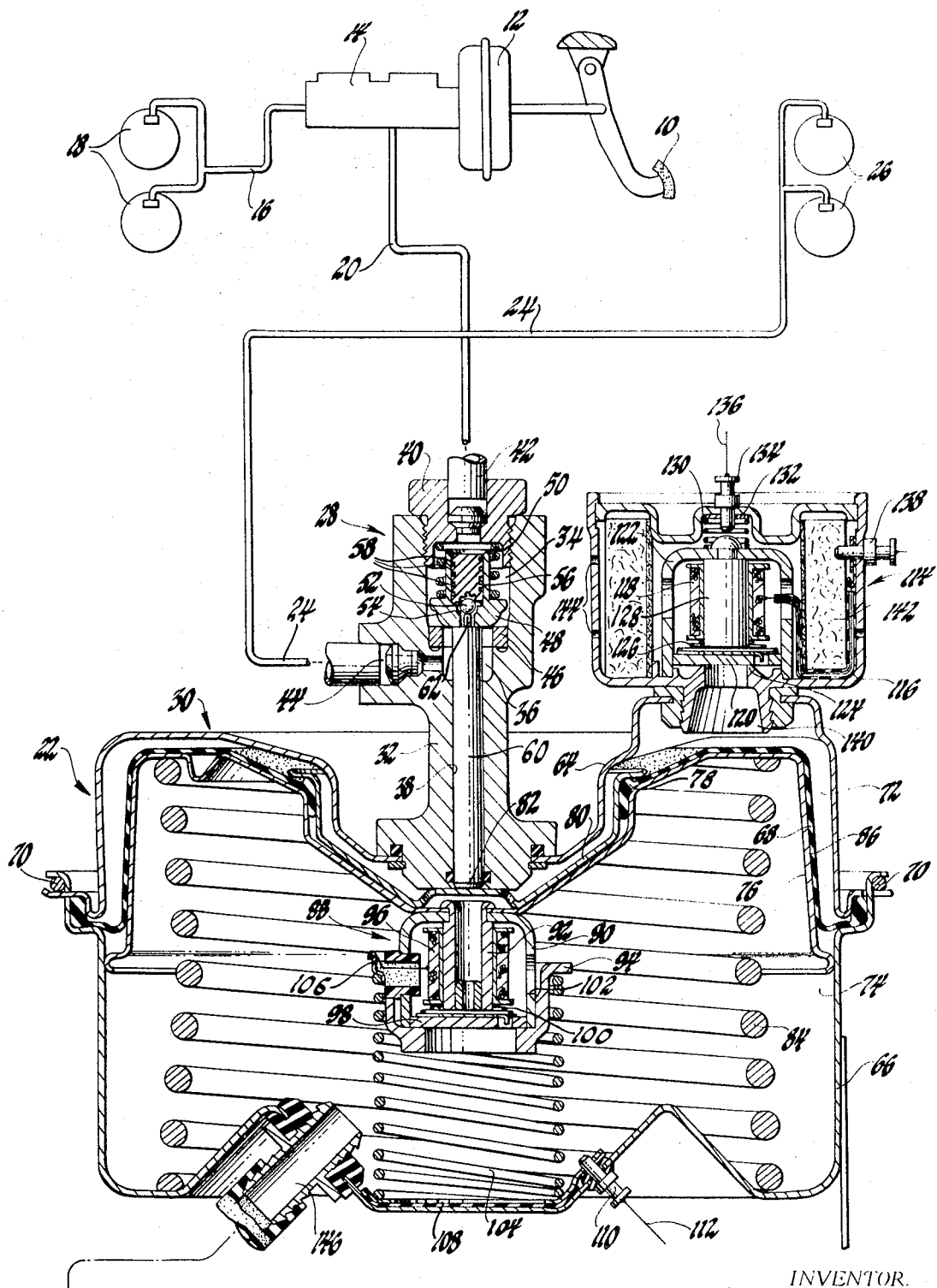
INVENTOR.
Edward J. DeHoff
BY
D. D. McGraw
ATTORNEY

PRESSURE MODULATOR

The invention relates to a pressure modulator and more particularly one for use in an antilock braking system to maintain high braking performance without causing the controlled wheels to lock. The modulator is an improvement on the modulator disclosed and claimed in U.S. Pat. No. 3,401,987, issued Sept. 17, 1968 to Robert A. Horvath, and assigned to the common assignee. The modulator may be utilized in systems generating electrical signals for modulator control, such systems being disclosed and claimed in U.S. Pat. No. 3,433,535, issued Mar. 18, 1969 to Robert A. Horvath; and U.S. Pat. No. 3,441,320, issued Apr. 29, 1969 to Donald M. Flory; both patents being assigned to the common assignee.

The modulator embodying the invention utilizes a novel arrangement of valving which provides an efficient and economical assembly eliminating hoses, piping and other ducting to transmit air at different pressures to the various modulator chambers. The modulator is able to control the brake circuit to which it is attached so that brake apply, release, and hold positions are obtained in accordance with the wheel antilock requirements as determined by the sensing unit. The modulator is particularly adapted for use with a system wherein wheel velocity changes are sensed electrically, evaluated electronically, and controlled through solenoid operated valving. The system provides for the most direct path available for transfer of control fluids, with the pressure chambers being selectively connected and disconnected internally in the modulator, thereby enhancing reliability and reducing exposure of control elements.

IN THE DRAWING

The single FIGURE is a schematic representation of a vehicle braking system having a modulator controlling one set of brakes, the modulator being illustrated in cross section and with parts broken away.

The vehicle brake system is illustrated as including a brake pedal 10 connected to the brake booster 12 to actuate the dual master cylinder assembly 14. One chamber of the master cylinder is connected by brake line 16 to the front wheel brakes 18, and the other chamber of the master cylinder is connected by brake line section 20 to the modulator 22 embodying the invention. The modulator is in turn connected through brake line section 24 to the rear wheel brakes 26. When the modulator is in its inactive position, brake line sections 20 and 24 are hydraulically connected so that actuation of the brake pedal causes the front wheel brakes 18 and the rear wheel brakes 26 to be respectively pressurized through their connected brake lines. While the modulator 22 is illustrated as being in the rear brake line of the vehicle, it may also be used in the front brake line, or in any desired circuit or circuits.

The modulator 22 has a valve assembly 28 and a servomotor assembly 30. The valve assembly 28 includes a housing 32 internally provided with a first valve chamber 34, a second chamber 36, and a piston bore 38. These chambers and the bore are interconnected and extend through the housing. The outer end of chamber 34 is provided with a suitable closure 40 which includes an inlet 42 connected to brake line section 20. An outlet 44 connects with chamber 36 and is connected to brake line section 24. A valve seat 46 is positioned within housing 32 between chambers 34 and 36. Valve 48 is mounted within chamber 34 and is arranged to seat on valve seat 46. Valve spring 50 urges valve 48 against the seat 46. Valve 48 is provided with a through-bore in which the check valve 52 is mounted. One end of the valve through-bore is provided with an annular check valve seat 54 which cooperates with valve 52. A plug 56 is received in the valve through-bore in spaced relation to valve seat 54 so that the check valve 52 may be moved off of the seat to open the through-bore. The plug is provided with an external spiral groove 58 which permits fluid to flow through the valve through-bore but provides sufficient restriction to prevent a surge therethrough. Valve 48 is substantially smaller than chamber 34 to permit fluid to flow between inlet 42 and chamber 36 when the valve is unseated.

A piston 60 is reciprocally received in bore 38 of housing 32 and has a pin 62 at its upper end. The upper end of the piston engages valve 48 while the pin 62 extends into the valve through-bore and lifts check valve 52 from its seat 54, as shown in the drawing. The lower end of piston 60 extends to the interior of servomotor 30, as will be described.

The servomotor 30 has housing sections 64 and 66 secured together to clamp the outer periphery of a power wall diaphragm 68 in place. A retaining ring 70 is provided to hold the housing sections 64 and 66 together. The diaphragm 68 divides the servomotor housing into a variable pressure chamber 72 and a substantially constant pressure chamber 74. In the preferred construction illustrated, chamber 74 is a vacuum chamber. Housing section 64 is sealingly mounted to one end of valve assembly housing 32 so that the end of piston 60 extends to chamber 72. A piston 76 is mounted in the servomotor 30 to support the diaphragm 68 and is secured to the inner periphery of the diaphragm as illustrated at 78. The vented piston section 80 of piston 76 is in abutting relation with the end 82 of piston 60. A servomotor return spring 84 is received in chamber 74 and urges the power wall 86, formed by diaphragm 68 and piston 76, toward valve assembly housing 32.

The hold valve assembly 88 is mounted on the piston 76 so that it selectively connects and disconnects chambers 72 and 74. The valve assembly 88 includes a vented case 90, one end of which is secured to piston 76 by means of a hollow rivetlike solenoid armature 92, and the other end of which is formed as a spring seat 94. A solenoid coil 96 is mounted about armature 92 and is selectively energized electrically.

The valve 98 is mounted adjacent the end of armature 92 opposite piston 76 and is movable in case 90 to open and close the end of the armature to provide control of pressure between chambers 72 and 74. A light spring 100 urges valve 98 in the unseated direction. The valve case has an orifice 102 admitting the pressure contained in chamber 74 to the area of valve opening and closing. A light spring 104 is retained by the spring seat 94 and engages an electrically conductive clip 106 which is in turn electrically connected to coil 96. Spring 104 has its other end abutting an electrical conductor 108 mounted on housing section 66. The connector 110 extends through control housing 66 and electrically connects with conductor 108. Suitable wiring 112 connects connector 110 with an appropriate antilock signal generator.

The release valve assembly 114 has a housing 116 secured to the servomotor housing section 64. The solenoid coil 118, the valve 120, and the case 122 are constructed in a similar manner to the corresponding elements of hold valve assembly 88. A valve seat 124 is formed as a part of housing 116 so that the valve 120 is urged against the seat by the light valve spring 126. The armature 128 is secured to the case 122, which in turn is electrically connected through a spring 130 to a metal clip 132. Connector 134 engages clip 132 and has connected to it suitable wiring 136 through which is transmitted signals from the antilock system signal generator. Coil 118 is electrically connected to connector 138.

The valve assembly housing 116 has a passage 140 extending through valve seat 124 so that the inner portion of the assembly 114 is connected to variable pressure chamber 72 when coil 118 is energized to hold valve 120 away from its seat. A suitable air filter 142 is provided in housing 116 and atmospheric air enters through appropriate air inlets 144, passes through filter 142 and is provided adjacent seat 124. Thus, when the valve 120 is unseated, atmospheric air enters the variable pressure chamber 72.

A vacuum supply inlet 146 is connected to a suitable vacuum source 148, which may be the vehicle engine intake manifold. Inlet 146 extends through servomotor housing 66 so that chamber 74 is maintained at a suitable vacuum level. While the actual pressure in chamber 74 may vary somewhat as the vacuum varies from the vacuum source, the pressure in chamber 74 may be considered to be substantially constant. When hold valve assembly 88 is in its normally open, deenergized position, vacuum is also present in chamber 72.

The system including the modulator is shown so as to at least initially directly apply hydraulic pressure to the vehicle wheel brakes without bringing the modulator into play. When the brake pedal 10 is pressed forward by the vehicle operator, brake pressure is transmitted through brake lines 16, 20 and 24 to the wheel brakes 18 and 26. In this condition, the modulator piston 60 is held in the upward position shown since the pressures are balanced on each side of power wall 86, permitting spring 84 to hold the power wall against the end of housing 32. This keeps piston 60 in its uppermost position in which it holds the valve 48 away from its seat 46, thereby connecting brake pressure inlet 42 with brake pressure outlet 44. The brake wheel velocity sensor utilized for operating the modulator is of any suitable type known in the art which will generate the required release, hold, and apply signals. These signals are either directly provided, or converted to electrical signals. When the sensor generates a signal indicating that the brake pressure to the wheel brakes 26 should be released, solenoid coils 96 and 118 are both energized, thus causing hold valve assembly 88 to disconnect modulator servomotor chambers 72 and 74, and opening release valve assembly 114 to connect chamber 72 with atmosphere. This causes a pressure differential to bias power wall 86 against the force of spring 84, moving the power wall away from valve assembly housing 32. Since brake pressure is contained in chambers 34 and 36, and also since spring 50 urges valve 48 in the same direction, the valve 48 and the piston 60 move downwardly as seen in the drawing, until valve 48 seats against valve 46. This movement cuts off the connection between the inlet 42 and outlet 44, leaving only valve 52 unseated. The hydraulic pressure in chamber 36 moves piston 60 downwardly to keep the piston in a following relation with power wall 86. Thus, pin 62 is withdrawn and valve 52 is seated on its seat 54. At this point the inlet 42 and outlet 44 are disconnected and no additional pressure can be transmitted from the master cylinder to the rear wheel brakes.

The pressure continuing to be exerted by the master cylinder merely holds valves 48 and 52 seated. Further movement of power wall 86 in the downward direction permits piston 60 to be forced downwardly by the action of hydraulic pressure in chamber 36, thus increasing the volume connected to rear wheel brakes 26 and thereby decreasing brake pressure to these brakes.

The wheel velocity sensor generates a signal requiring the reduced brake pressure to be held in the rear wheel brakes 26. This signal causes deenergization of release valve assembly solenoid 118, so that valve 120 is seated. This prevents further entry of air at atmospheric pressure into chamber 72, thereby establishing a poised position of the power wall 86. This position in turn determines the brake pressure remaining in the rear wheel brakes. This brake pressure is sufficiently low to permit an increase in the velocity of the rear wheels, while continuing to have some braking effect.

When the wheels are at a sufficiently high velocity to warrant reapplication of the rear wheel brakes, the sensor causes deenergization of hold valve assembly solenoid 96, and the hold valve 98 becomes unseated. This reconnects chamber 74 to 72, so that vacuum is again impressed on both sides of power wall 86. This balancing of pressure across the power wall permits spring 84 to move the power wall upwardly. Piston 60 is in turn moved upwardly, decreasing the volume of chamber 36 and increasing the pressure to the rear wheel brakes 26. Assuming that the reapply condition is to be maintained, power wall 86 moves piston 60 upwardly so that the pin 62 unseats valve 52. This permits hydraulic pressure to pass through the spiral groove 58 into chamber 34. Since this is a somewhat restricted connection at this point, a sudden surge of pressure is prevented. Further upward movement of piston 60 moves valve 48 away from its seat 46, thereby reconnecting inlet 42 and outlet 44. Thus, full pressure being generated by the master cylinder is again applied to the rear wheel brakes.

This cycle will continue until the vehicle stops, or the sensor no longer requires this, a change in brake apply pressure, or until the brakes are released by the vehicle operator.

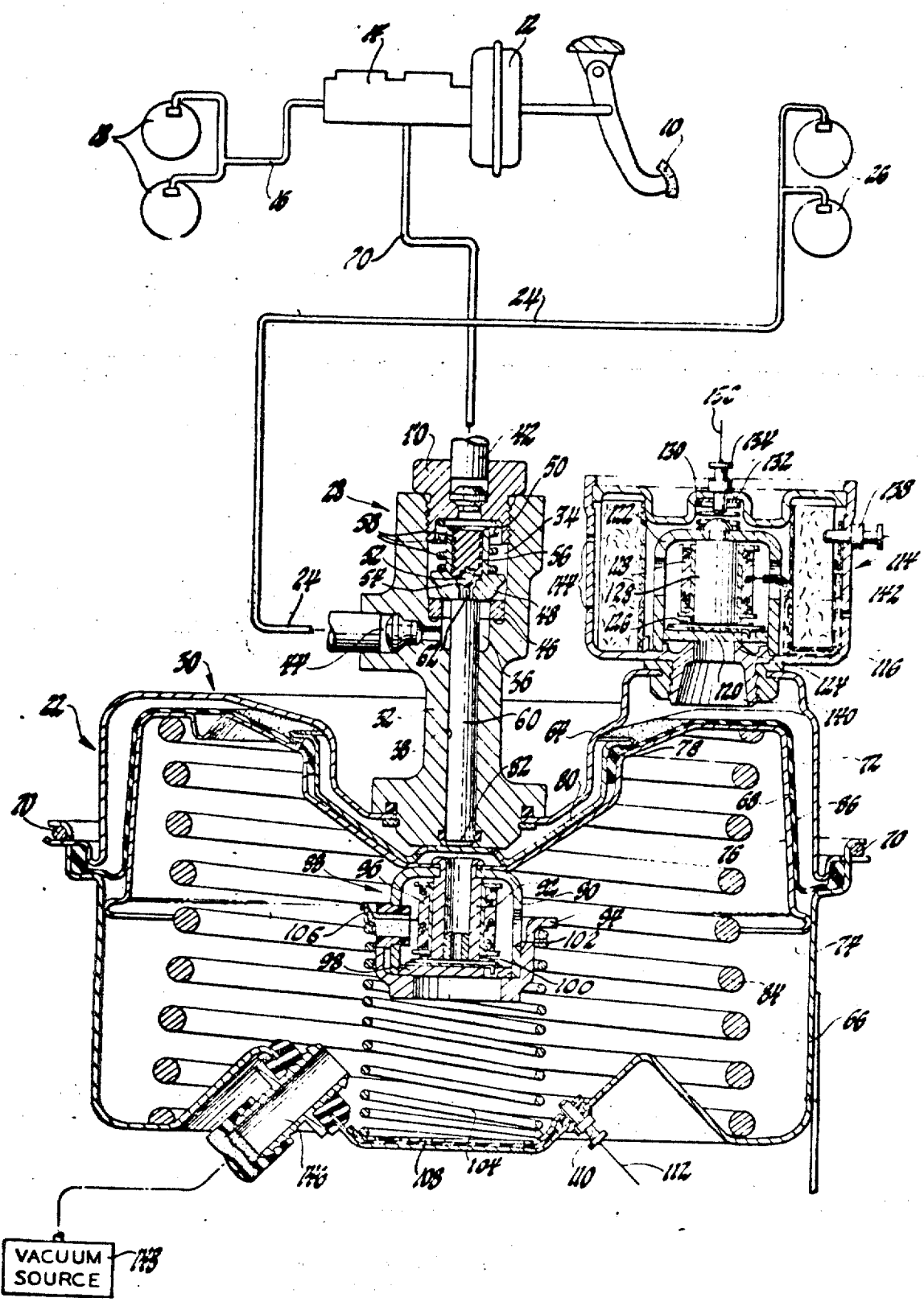

What I claim is:

1. A pressure modulator assembly for use in a pressure circuit to be controlled by sensor means generating first and second signals, said assembly comprising:
   a housing having
      a pressure inlet and a pressure outlet adapted to be connected in the pressure circuit to be controlled,
      valve means for opening and closing the pressure circuit,
      and outlet volume control means for decreasing and increasing pressure in the outlet portion of the pressure circuit;
   a servomotor secured to said housing and having
      a power wall dividing said servomotor into a first substantially constant pressure chamber and a second variable pressure chamber, said power wall being associated with said valve means and said outlet volume control means to control the opening and closing of said valve means and to control the pressure decreasing and increasing actions of said outlet volume control means by movements of said power wall,
      a first servomotor valve assembly connected to a first source of pressure and to said variable pressure chamber and controlling pressure transmission therebetween and including first valve actuating means,
      a second servomotor valve assembly connected to said variable pressure chamber and to said substantially constant pressure chamber and controlling pressure transmission therebetween and including second valve actuating means independent of said first valve actuating means,
      and a second source of pressure at a lesser pressure than said first source of pressure and connected to said substantially constant pressure chamber;
   said first and second servomotor valve assembly valve actuating means respectively receiving the first and second signals from the sensor means and respectively varying the pressure in said variable pressure chamber and holding the pressure therein at any desired value between the pressures of said first and second pressure sources to control the movement and position of said power wall in accordance with the first and second signals to in turn control the opening and closing of said valve means and the decreasing and increasing pressure action of said outlet volume control means.

2. The pressure modulator assembly of claim 1,
said second servomotor valve assembly being mounted in one of said chambers on said power wall and having a valve controlled passage extending through said power wall and interconnecting said chambers through said valve assembly.

3. The pressure modulator assembly of claim 1,
said first servomotor valve assembly being connected to atmospheric air as the first source of pressure and having a normally closed position and being moved to an open position by said first valve actuating means independently of said second servomotor valve assembly upon receipt of the first signal by said first valve actuating means.

4. The pressure modulator assembly of claim 3,
said second servomotor valve assembly having a normally open position and being closed by said second valve actuating means independently of said first valve assembly upon receipt of the second signal by said second valve actuating means.

5. The pressure modulator assembly of claim 4,
said modulator assembly having three stages of operation, the first stage occurring with said first servomotor valve assembly being closed and said second servomotor valve assembly being open, the second stage of operation occurring when said first servomotor valve assembly actuating means receives the first signal and opens said first servomotor valve assembly to permit atmospheric pressure to enter said variable pressure chamber with said second servomotor valve assembly actuating means receiving the second signal and actuating said second servomotor valve assembly to close the connection between said servomotor chambers to cause movement of said power wall to close said valve means and disconnect said inlet and said outlet, the third stage of operation occurring when said first servomotor valve assembly returns to the normally closed position upon termination of the first signal while said second servomotor valve assembly actuating means continues to receive the second signal and hold said second servomotor valve assembly closed so that a set pressure differential occurs across said power wall to hold said power wall in a desired position, said power wall having moved sufficiently to permit said outlet valve control means to decrease pressure in the outlet portion of the pressure circuit, said servomotor assembly returning to the first stage of operation upon cessation of receipt of the second signal by said second servomotor valve assembly actuating means, said servomotor assembly having means therein acting upon return to said first stage of operation to move said power wall to cause said outlet volume control means to increase pressure in the outlet portion of the pressure circuit and to open said valve means to reconnect said pressure inlet and said pressure outlet.

UNITED STATES PATENT OFFICE
CERTIFICATE OF CORRECTION

Patent No. 3,592,514      Dated July 13, 1971

Inventor(s) Edward J. De Hoff

It is certified that error appears in the above-identified patent and that said Letters Patent are hereby corrected as shown below:

Cancel the illustrative drawing on the cover sheet and substitute the attached sheet.

Signed and sealed this 26th day of December 1972.

(SEAL)
Attest:

EDWARD M. FLETCHER, JR.
Attesting Officer

ROBERT GOTTSCHALK
Commissioner of Patents